United States Patent [19]

Macken

[11] Patent Number: 4,756,000
[45] Date of Patent: Jul. 5, 1988

[54] DISCHARGE DRIVEN GOLD CATALYST WITH APPLICATION TO A $CO_2$ LASER

[76] Inventor: John A. Macken, 3755 Wallace Rd., Santa Rosa, Calif. 95404

[21] Appl. No.: 16,061

[22] Filed: Feb. 18, 1987

[51] Int. Cl.[4] .................................. H01S 3/22
[52] U.S. Cl. ............................ 372/59; 372/98; 372/92
[58] Field of Search ............ 372/59, 87, 83, 89, 372/55, 61, 92, 34; 378/98, 58, 81

[56] References Cited

U.S. PATENT DOCUMENTS

| | | | |
|---|---|---|---|
| 4,617,668 | 10/1986 | Rudko et al. | 372/59 |
| 4,639,926 | 1/1987 | Wana et al. | 372/56 |
| 4,641,313 | 2/1987 | Tobin et al. | 378/56 |
| 4,651,324 | 3/1987 | Prein et al. | 372/59 |

FOREIGN PATENT DOCUMENTS

| | | | |
|---|---|---|---|
| 1256398 | 12/1971 | United Kingdom | 372/59 |
| 2083944 | 3/1982 | United Kingdom | 372/59 |
| 2028571 | 3/1986 | United Kingdom | 372/59 |

Primary Examiner—Léon Scott, Jr.
Attorney, Agent, or Firm—Edward E. Roberts

[57] ABSTRACT

A device and process using a gold as a catalyst for oxidizing carbon monoxide to form $CO_2$ at ambient temperatures. This has particular application to $CO_2$ lasers. In one $CO_2$ laser embodiment, gold is distributed on the walls of the discharge volume. The gold is divided to form electrically isolated islands to prevent interference with the discharge. Energetic forms of oxygen, such as atomic oxygen reacts with CO on the gold catalyst. In another embodiment, the gold catalyst is used in a convective flow laser.

11 Claims, 2 Drawing Sheets

DISCHARGE DRIVEN GOLD CATALYST WITH APPLICATION TO A CO₂ LASER

BACKGROUND OF THE INVENTION

The background of the invention will be discussed in two parts:

1. Field of the Invention

This invention relates to both catalysts and lasers. More particularly, it relates to a method and apparatus for improving $CO_2$ lasers by catalytically reforming $CO_2$ which was decomposed by the electrical discharge.

2. Description of the Prior Art

Since the $CO_2$ laser was invented, an undesirable characteristic of this laser has been the fact that the electrical discharge needed to excite the laser gas also causes the $CO_2$ in the discharge to disassociate according to one of the following two reactions:

$$CO_2 + e \rightarrow CO + O^-$$

$$CO_2 + e \rightarrow CO + O + e$$

where "e" represents an electron in the discharge.

This reaction eventually reaches an equilibrium according to the reaction:

$$CO + \tfrac{1}{2}O_2 \rightleftharpoons CO_2$$

However, this equilibrium usually is not reached until more than 60% of the $CO_2$ is decomposed. The problem is that the decomposition products of CO and $O_2$ have a partial poisoning effect on the laser. The result is characterized by a loss of power, a loss of gain, and a destabilization of the electric discharge.

In higher power lasers, this damaging effect is dealt with by continuously flowing the gas (a mixture of $CO_2$, $N_2$ and He with helium making up about 80% of the total) through a discharge in a time short enough to permit only partial decomposition of the $CO_2$. The rate of decomposition depends on many factors such as current density and gas pressure, but, in general, it can be said that the decomposition rate is quite rapid, usually with a time constant between 0.01 second and 10 seconds.

This reaction was first identified and characterized by the applicant herein in 1967. Since that time, there have been many studies of this process in an attempt to minimize the gas consumption expense and nuisance associated with high power $CO_2$ lasers. At lower power levels, (less than 60 watts) sealed off $CO_2$ lasers have been constructed and used wherein the loss in power associated with the partial breakdown of the $CO_2$ in the electrical discharge has been accepted.

If a $CO_2$ laser merely flows the gas through the laser once and expels the gas, it can consume a substantial quantity of helium. For example, a 1000 watt $CO_2$ laser with no recycling of gas can consume about 100 liters of laser gas (mostly helium) at standard pressure and temperature in one hour. Fortunately, it has been found possible to reconvert the CO and $O_2$ to $CO_2$ through the use of a platinum catalyst heated to about 330° C. To do this, a vacuum pump is used to continuously circulate the gas through a closed loop which includes the electrical discharge section of the laser, the heated catalyst and the vacuum pump. Unfortunately, this process is not only expensive in terms of equipment and complexity, but it is also still wasteful of gas, since about 10% of the gas must be dumped with each cycle and new gas added. Therefore, presently, a 1000 watt $CO_2$ laser equipped with a platinum recycler typically consumes about 10 liters of laser gas per hour.

This problem can be placed in greater perspective when it is realized that presently there have been about 10,000 $CO_2$ lasers sold worldwide. While some of these are sealed off, the majority are consuming a vast amount of helium which is not only expensive, but depleting a natural resource which has a limited supply. The sealed off $CO_2$ lasers do not consume helium, but pay a different kind of penalty since they usually run at an output power which is considerably reduced compared to a comparable size flowing $CO_2$ laser.

This problem has received a great deal of attention. The following articles and patents are cited as prior art references:

1. P. D. Tannen et al "Species Composition in the $CO_2$ Discharge Laser" IEEE Journal of Quantum Electronics Vol QE10, No. 1 1974;
2. C. Willis "Catalytic Control of the Gas Chemistry of Sealed TEA $CO_2$ Lasers" J. Appl. Phys. 50 (4) April 1979;
3. D. S. Stark "A Sealed 100 Hz $CO_2$ TEA Laser Using High $CO_2$ Concentrations and Ambient Temperature Catalysts" J. Phys. E: Sci. Instrum. 16 1983 158–161;
4. U.S. Pat. No. 3,789,320 W. D. Hepburn "Gas Laser Circulation System";
5. U.S. Pat. No. 3,569,857 J. A. Macken "Method and Means for Achieving Chemical Equilibrium in a Sealed Off $CO_2$ Laser; and
6. A. B. Lamb et al "The Removal of Carbon Monoxide from Air" J. of Industrial and Eng. Chem. March 1920.

In addition to the use of external catalyst, there has also been some attempt to place the catalyst inside the laser by using a heated platinum wire inside the laser or using a heated cathode which shows catalytic activity. However, this has been unsuccessful in significantly reversing the breakdown of $CO_2$ because gas diffusion is too slow to carry the gas to a small area of the tube containing the heated platinum wire or the heated cathode. It is not possible to coat large portions of the laser discharge cavity with heated platinum. While this would be successful in reconstituting the decomposed gas, the $CO_2$ laser would stop lasing because the large area heated platinum would also raise the gas temperature to an unacceptable level for laser action.

Catalysts which work at ambient temperature for the CO—$O_2$ reaction are also very slow compared to heated platinum. These ambient temperature catalysts include platinum on tin oxide (Ref. #3), Hopcalite (Ref. #6-50% $MnO_2$, 30% AuO, 15% $CO_2O_3$ and 5% $Ag_2O$) and Cobalt oxide (Ref. #6). To use these catalysts at ambient temperature, it is necessary to offset the slow reaction rates by providing intimate contact between the gas and the catalyst. This is usually done by flowing the gas through a granular form of the catalyst.

This requires placing the catalyst away from the laser amplification volume. A pump is used to circulate the gas through the catalyst. Tests indicate that these above mentioned ambient temperature catalysts cannot be used inside the laser on the walls of the discharge volume for various reasons, such as slow reaction rates, destabilization of the discharge and chemical decomposition of the catalyst.

In contrast to the prior art, this invention teaches a way of reconstituting the decomposed $CO_2$ inside the electrical discharge cavity of a $CO_2$ laser. This can be done at ambient temperature, without destabilizing the discharge and without the need to recirculate the gas. It is also possible to use the teachings of this invention to reconstitute the decomposed $CO_2$ in a "flow" laser. In this case, the low operating temperature of this process does not require the use of additional heating of the gas as would be required in a platinum catalyst. These and other advantages will be presented. The teachings of this invention are also applicable to other devices in addition to lasers.

SUMMARY OF INVENTION

In a $CO_2$ laser, the electrical discharge has an undesirable side effect of decomposing the $CO_2$ to carbon monoxide and oxygen. However, the electric discharge also makes short lived, energetic forms of oxygen which are very reactive. This invention describes a catalyst which only works in the presence of these short lived energetic forms of oxygen.

In one embodiment of the invention, finely divided gold coats the walls facing the laser amplification volume. At ambient temperature, the CO and energetic forms of oxygen (such as atomic oxygen) can rapidly react on the gold surface.

In diffusion limited lasers, the gold catalyst should be broadly distributed on the walls facing the discharge. The gold is divided sufficiently to prevent deviating the electrical discharge.

In another embodiment applicable to convective flow lasers, the gold catalyst is positioned in the flowing gas near the exhaust end of the laser discharge. Besides lasers, this invention has application to other environments which generate energetic forms of oxygen.

DESCRIPTION OF THE PREFERRED EMBODIMENTS

Figure 1:
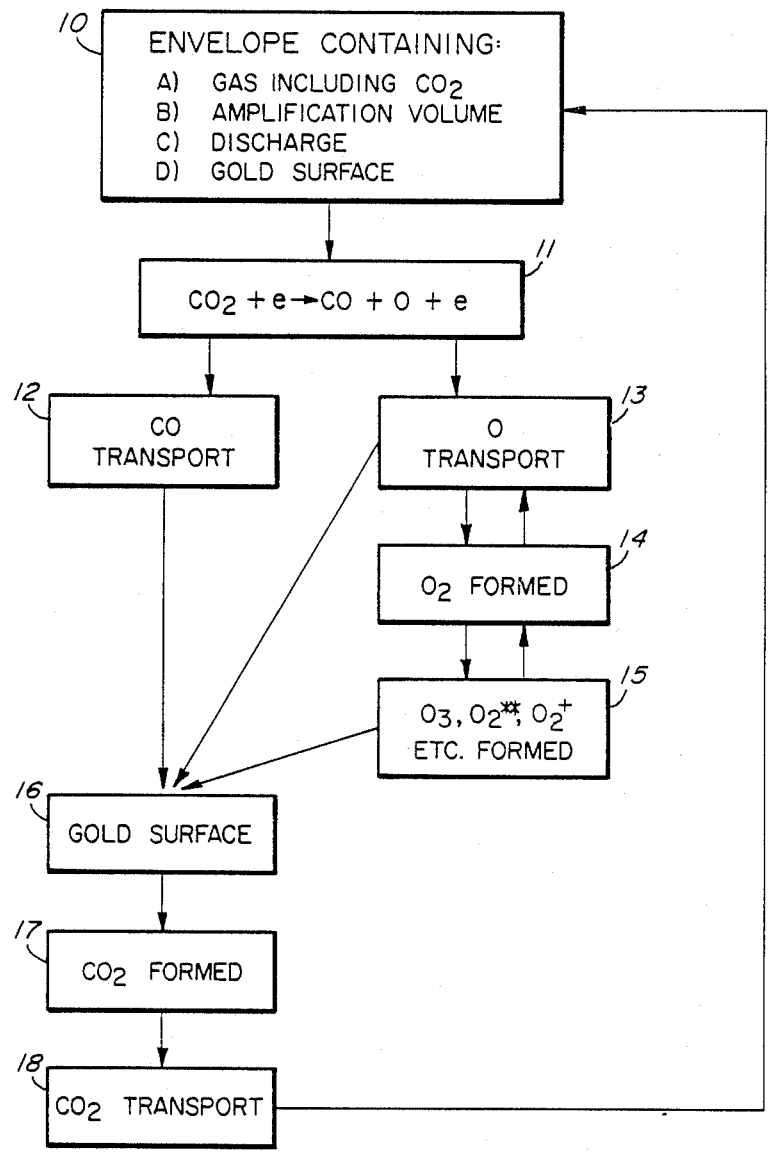
FIG. 1 is a flow diagram showing the chemical and mechanical processes.

The $CO-O_2$ reaction is exothermic, but does not proceed at ambient temperature because there is a large activation energy associated with the initiation of the reaction. A non-catalytic material, such as aluminum oxide must be heated to 1000° K. in a CO and $O_2$ gas mixture for this reaction to proceed. Even at 1000° C. only a small percentage of the thermally excited molecules achieve a high enough energy to overcome this activation energy and oxidize the CO to $CO_2$. This is an example of a thermally driven chemical reaction because the kinetic energy of the molecules is used to overcome the activation energy. The activation energy for oxidation of CO by $O_2$ is estimated to be in excess of 1.5 electron volts.

Even the use of catalysts, such as platinum, paladium, cobalt oxide and Hopcalite depend only on heat (kinetic energy of the molecules) to overcome the activation energy. The catalyst merely reduced this activation energy by providing intermediate reactions. However, it has been realized by applicant that inside the $CO_2$ laser, there is a unique environment which offers a new approach to catalysts.

Inside the $CO_2$ laser, the electric discharge makes energetic species of oxygen compared to $O_2$. This energetic oxygen usually cannot combine with CO (without a third body) because there is apparently *too much* energy available. It is no longer a problem of overcoming the activation energy, but in the gaseous phase, the problem is removing energy so that the $CO_2$ molecule can hold together. For example, the very process of decomposing $CO_2$ yields atomic oxygen (O) according to the equation:

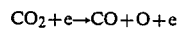

$$CO_2 + e \rightarrow CO + O + e$$

Atomic oxygen can also be formed inside the discharge in several ways, including the following:

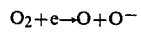

$$O_2 + e \rightarrow O + O^-$$

The atomic oxygen often lasts until it diffuses to the wall. Some of the atomic oxygen also combines with $O_2$ to form Ozone $O_3$ but this reaction also needs a third body. Ozone is also very reactive.

Finally, diatomic oxygen ($O_2$) is known to have at least two long lived excited vibrational states which will be designated as $O_2^*$ and $O_2^{**}$. Therefore, even molecular oxygen ($O_2$) is being continuously excited to an energetic species as long as it remains in the discharge. Therefore, in the discharge, there exists at least four forms of energetic oxygen which are electrically neutral. None of these would normally be encountered either in air or in the laser gas once the gas has left the discharge region for a time longer than the life time of the various species of energetic oxygen. In summary, these four neutral energetic oxygen states and their energies of formation relative to $O_2$ are:

(1) Atomic oxygen: O~2.6 ev (endothermic 250 KJ/mol)
(2) Ozone: $O_3$~1.5 ev (endothermic 140 KJ/mol)
(3) Excited oxygen: $O_2^*$~1 ev (endothermic 92 KJ/mol)
(4) Excited oxygen: $O_2^{**}$~1.6 ev (endothermic 154 KJ/mol)

Besides, the above neutral forms of energetic oxygen, there are also various ionized sources of energetic oxygen which have been identified in the $CO_2$ laser discharge. The major positively charged ions which can also serve as a source of oxygen are:

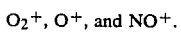

$$O_2^+, O^+, \text{ and } NO^+.$$

The positively charged ions are partially attracted to the walls of the discharge cavity to neutralize the electron diffusion to these walls. Finally, it is possible that the ultraviolet light generated in a discharge can be absorbed by certain solids in a way as to create "hot" electrons which can disassociate $O_2$ into atomic oxygen on the surface of the solid. (See "Ultraviolet Light Stimulated Thermal Oxidation of Silicon" E. M. Young, Appl. Phys. Lett.) Of all the energetic forms of oxygen mentioned, atomic oxygen is probably the most important because of its abundance and reactivity.

All of these neutral and ionized species except for ozone are usually deactivated with a wall collision. At the reduced gas pressure and discharge cavity size of a slowly flowing $CO_2$ laser, they usually have a half life less than 20 milliseconds. However, in some flow lasers operating with large cavity sizes at higher pressures, the diffusion to the wall is greatly reduced. It may be possible for some of these neutral energetic forms of oxygen to survive for up to one tenth second.

The goal, therefore, is to make use of the energy in these short lived energetic forms of oxygen (and possibly the ultra violet light) so that at least a portion of the driving energy for a catalytic reaction comes from the discharge. This would permit the thermal energy requirement to be kept low enough that a fast catalyzed reaction can proceed at temperatures below about 50° C.

In application of the approach described above, two classes of materials were found which catalyze the formation of $CO_2$ in the laser environment. These materials are gold and certain endothermic oxides of silver. This application deals with the use of gold as a catalyst. A co-pending application entitled "DISCHARGE DRIVEN SILVER OXIDE CATALYST WITH APPLICATION TO A $CO_2$ LASER", discloses the use of silver oxides as a catalyst.

Even though gold is not a catalyst for the $CO-O^2$ reaction, gold is a catalyst for the reaction between CO and at least some of the energetic forms of oxygen. Possible reactions include:

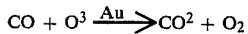

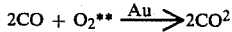

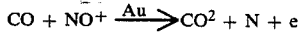

When used properly, gold catalyzes the formation of $CO_2$ at ambient temperature. A gold catalyst is also fast enough to compete against the decomposition rate of $CO_2$ inside the laser. Gold also can form a vey adherent film which will not flake off inside the laser. The electrical conductivity and high reflectivity of gold can present problems when used on the walls facing the discharge, as discussed below.

FIG. 1 is a flow chart indicating some of the steps involved in using gold as a catalyst. The first step (10) involves providing an envelope which contains the laser gas and the portion of the laser which will be called the "laser amplification volume." This is the volume where the stimulated emission of radiation is taking place. This volume contains the optical beam, and almost always contains at least a portion of the electrical discharge. In addition to these standard components of a $CO_2$ laser, a special gold coated surface is added. As discussed below, this gold is configured and positioned to serve as a catalyst.

Block 11 of FIG. 1 represents the breaking apart of the $CO_2$ by the electrical discharge. This proceeds at a rate which depends on several factors including current density, gas pressure and gas composition.

Typically, in continuous lasers, the rate of decomposition can proceed so that the half-life of a $CO_2$ molecule can range from 0.1 second to several seconds. A chemical equilibrium is eventually reached. However, this equilibrium is not usually reached until approximately 60% of the $CO_2$ has been decomposed. This of course has detrimental results on the laser power, gain, efficiency, and discharge stability.

In FIG. 1, block 11 can also be thought of as the first step in the process of reconstituting the $CO_2$, since, in block 11, CO and O are formed. Since CO is stable, the transportation of CO to the gold surface (block 12) is generally uncomplicated. However, the atomic oxygen (block 13) has a limited lifetime. It can combine with another atomic oxygen atom to form $O_2$ (block 14), but this requires a third body such as a wall or a three body collision in the gas phase.

If the $O_2$ is still in the discharge, it can be broken apart again forming atomic oxygen (reverse arrow to block 13), or it can form some other species of energetic oxygen (block 15). Energetic oxygen can eventually reach the gold (block 16) by diffusion or conduction. On the gold catalyst, some species of energetic oxygen) can oxidize the CO to form $CO_2$ (block 17). In block 18, the $CO_2$ is transported (by diffusion or conduction) back to the amplification volume. This replaces $CO_2$ in the gas mixture and the cycle can start over again.

In FIG. 1, note that block 11 is the decomposition step. The other blocks are involved with reconstituting the decomposed $CO_2$. Ideally, the rates of all of these other steps put together should be much faster than the rate for step 11. Fortunately, this goal can be achieved with a gold catalyst when it is properly positioned in the laser. Further, if the gas is removed from the discharge and does not reach the gold, then the process will eventually be halted at block 13 which is the formation of $O_2$.

Figure 2:
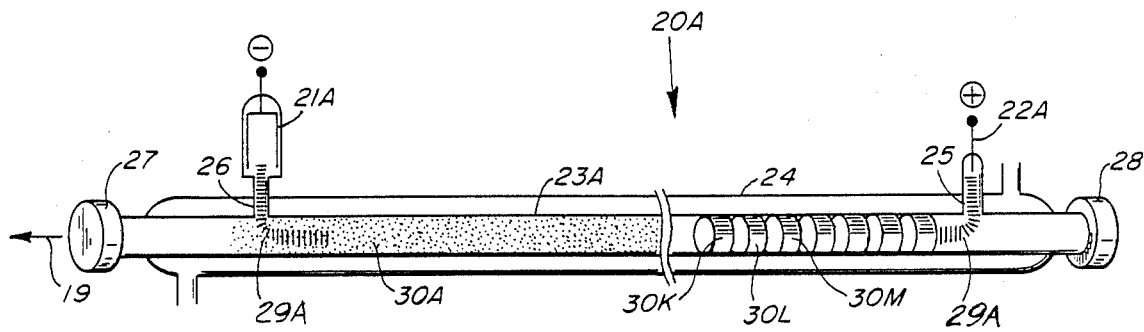
FIG. 2 is a side view diagram of a conventional $CO_2$ laser broken into two sections to demonstrate two different placement methods for the catalyst.
Figure 3:
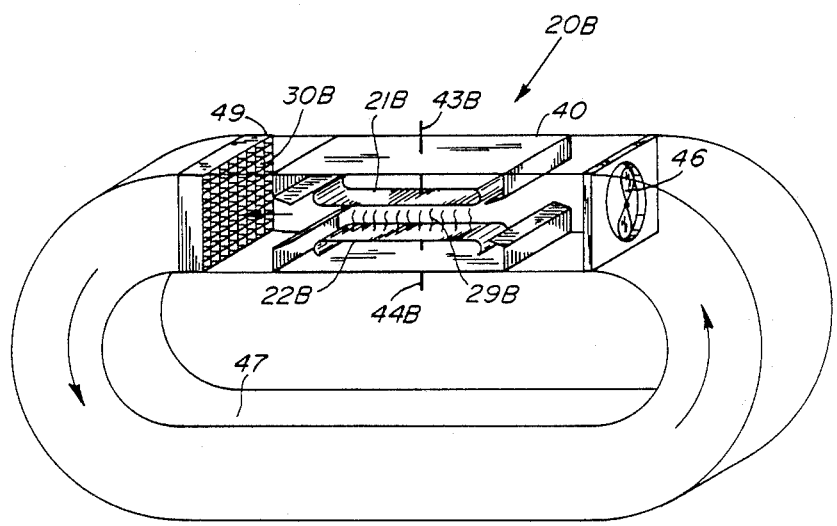
FIG. 3 is a perspective view of a convective flow $CO_2$ laser incorporating the catalyst.
Figure 4:
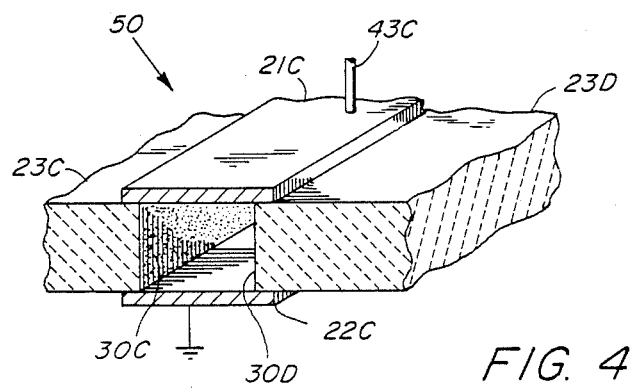
FIG. 4 is a perspective cross sectioned view of a portion of a waveguide laser.

FIGS. 2, 3 and 4 depict three different types of laser structures. However, in these figures, there are parts which perform analogous functions. Therefore, when it is important to understand the analogy, the numbering of the parts will be similar (30A, 30B, 30C, etc.).

FIG. 2 illustrates two ways of implementing the use of a gold catalyst. In FIG. 2, 20A is a representation of a $CO_2$ laser which can either be considered sealed off or slowly flowing gas (pump not shown). The cathode (21A) and anode 22A are connected to a source of electrical power (not shown). The laser has an inner tube (23A) surrounded by an outer tube 24. Water or other cooling fluid is flowed through the space between tubes 23A and 24. Tube 26 connects cathode 21A to tube 23A, while tube 25 connects anode 22A to tube 23A laser resonator. Mirrors 27 and 28 are positioned at the end of tube 23A. A laser gas mixture, such as $CO_2$, $N_2$ and He (perhaps CO and Xe also) is inside the closed envelop formed by tubes 23A, 25, 26 and mirrors 27, 28.

When electrical power is applied to electrodes 21A and 22A, a discharge 29A is formed through tube 23A. The electrical discharge is only partly shown in FIG. 2 to avoid confusion with the illustration of the catalyst. In FIG. 2, the amplification volume would be the portion of tube 23A between the points of connection for tubes 26 and 25. This is the volume containing both the discharge and the laser beam.

To obtain a beneficial effect, it is necessary to distribute clean gold on the inside walls of tube 23A facing the amplification volume. However, since gold is an electrical conductor, the gold must be broken up into electrically insulated islands to prevent the discharge from deviating from the gas and passing through the gold. If this were to happen, a cathode would form at one end of the gold and an anode would form at the other end of the gold strip.

Since the cathode drop is about 450 V in a $CO_2$ gas mixture, the discharge will not pass through the gold if individual gold islands are made small enough that the voltage gradient across individual electrically conducting islands is less than 450 volts. The voltage gradient depends on many factors, but a typical voltage gradient would be 100 V/cm. In this example, the gold should be made shorter than 4.5 cm in the direction of the electric field gradient to avoid this undesirable discharge deviation. However, in practice, it is desirable to make the islands much smaller than this limit. In the preferred embodiment, the islands would have a length in the direction of the electric field gradient less than ½ tube diameter.

In addition to the electrical requirements to break up the gold, there is also an optical requirement to prevent unwanted stray reflection lasing which can reduce the output power. Breaking up the gold also introduces optical losses which can satisfy the optical requirements.

Returning to FIG. 2, rings 31K, 31L, 31M, etc. represent gold deposits on the inside of tube 23A. As can be seen, these rings are separated from each other and are a length parallel to the axis of tube 23A which is about ½ tube diameter. These rings could also represent coiled sheets of springy metal, such as gold plated nickel. These could be held in place by friction due to the spring tension in the metal.

Another alternative is illustrated in the other half of tube 23A in FIG. 2. The coating 30A is depicted as consisting of many fine dots. This is meant to represent a gold coating which is divided on a microscopic scale so that there is no electrical conduction along the surface. This coating appears continuous to the eye, although it is not a mirror surface. One form of microscopically divided gold has a diffusely reflecting light brown color. One method of preparing this type of coating is discussed below. In preparing a microscopically divided coating, the divisions result from the coating process while in a macroscopically divided catalyst, such as 31L, 31L, etc.; the divisions are usually the results of an extra step. In either case, the inclusion of divisions, or gaps, is included in the preferred embodiment.

It is desireable to cover with gold as much of the area facing the amplification volume as possible provided the reflectivity does not become high enough to cause stray reflection lasing. However, even though acceptable performance may be obtained with less gold coating, good performance is still obtained when only 15% of the area is covered provided that the gold is distributed along the length of the amplification volume. The gaps in the gold parallel to the tube axis should preferably be kept smaller than one tube diameter in length.

FIG. 3 shows a portion of a transverse flow $CO_2$ laser. In FIG. 3, the electrical discharge is represented by 29B between electrodes 21B and 22B. Electrical power is fed to these electrodes by wires 43B and 44B respectively. These electrodes are supported by structure 40. Fan 46 represents a pump which circulates the laser gas through the closed loop path depicted by the flow arrows. Structure 47 forms this path. Multiple channel structure 49 is coated with the gold catalyst 30B. This structure 49 could perform double duty if it was also the heat exchanger required to cool the gas.

The requirements for making intimate contact with the gas are the same for both the heat exchanger and the catalyst. Therefore, combining these functions may be desirable, but not necessary. It is possible to use an electrically conducting gold coating for coating 30B, since there is no electrical gradient near 30B.

The positioning of catalyst 30B is intended to be close to the exhaust of the discharge region because it is desirable to capture as much energetic oxygen as possible to achieve a high catalytic conversion efficiency.

In FIG. 3, the laser mirrors are not shown, but they would face each other through the discharge volume 29B. They would be part of the envelope which contains the laser gas.

FIG. 4 is a cross section of a portion of an RF waveguide laser. However, this figure can also be used to illustrate the preferred embodiment for any square or rectangular cavity with a transverse discharge. For example, this would include a "T" laser or a high aspect ratio rectangular cavity, such as described in applicant's pending patent application titled "Magnetically Enhanced Electrical Discharge with Application to Lasers."

In FIG. 4, plates 21C and 22C are electrodes. For a waveguide laser, these are flat metal plates which are electrically driven through terminal 43C. Plate 22C is connected to ground as shown. However, it is to be understood that in other transverse discharge laser configurations (whether AC, DC or pulsed) these plates merely represent the appropriate electrode configuration. Parts 23C and 23D are dielectric pieces, such as ceramic. The surface of dielectrics 23C and 23D which face the amplification volume, are shown as 30C and 30D respectively.

As further discussed below, the preferred embodiment has the gold catalyst placed on surfaces 30C and 30D. As shown in FIG. 4, surface 30D is visible and illustrated by small dots which represent microscopically divided gold similar to 30A in FIG. 2. However, it is to be understood that macroscopically divided gold would also be acceptable. The inside surfaces of plates 51 and 52 could also be gold coated, however, these surfaces will have reduced catalytic activity when they are also used as electrodes.

Variations on FIG. 4 can be envisioned by those skilled in the art. For instance, if plates 23C and 23D were greatly enlarged in the direction parallel to the electric field gradient, then the cavity would be rectangular similar to the cavity in the above mentioned pending patent application of applicant. If plates 21C and 22C were replaced by the electrode configuration (such as multiple pins) appropriate for "T" lasers, then the dielectric surface between the pin electrodes could also be coated with a gold catalyst.

The catalytic action of gold can be visually observed, since the color of a $CO_2$, $N_2$, He discharge changes depending on the amount of decomposition products (primarily CO) present in the gas mixture. A discharge which has less than about 25% of the $CO_2$ decomposed is usually pink in color while a greater decomposition turns the discharge white.

The first experiment which successfully demonstrated the catalytic action of gold involved coating brass strips 7.5 cm long, 1.2 cm wide and 0.0125 cm thick with a thin layer of $Au_2O_3$ made into a moist paste by adding a small amount of water. This paste was spread on one side of the brass strips and allowed to dry. The $Au_2O_3$ was then reduced to gold black (finely divided gold) by exposure to CO gas. Heat can also be used to reduce the $Au_2O_3$.

The brass strips where then coiled into rings (gold facing inward) and placed in a tube similar to FIG. 2 where tube 23A was 28 mm in inner diameter. The rings were spaced similar to the placement of 31K 31L 31M etc. in FIG. 1. In a sealed off tube with an initial gas mixture of 7% $CO_2$, 13% $N_2$ and 80% He at a pressure of 12 torr and a current of 40 ma, the pink color in the discharge is visible in the region of the tube containing the rings. However, a portion of the tube was purposely left without gold coated rings and this region had a white discharge indicating decomposed gas.

Gold in other forms has also been tested. When gold oxide is applied to ceramic sheets and reduced with heat at 300° C., a gold black is formed. This works as a catalyst, but this can be also be electrically conducting. It has been found that when these ceramic sheets are heated much hotter (800° C. to 1100° C.), the gold black changes to a light brown color or perhaps a red brown color depending on the coating and heating process. This is microscopically divided gold which is fused onto the ceramic surface forming very small islands. This form makes an excellent catalyst because it combines durability and electrical insulation. Nickel strips have also been electroplated with very pure gold and found to also make a good catalyst. However, contaminants such as oils from finger prints, or some impure electroplating techniques, can degrade the catalyst.

Coating gold on objects is an ancient art with variations too numerous to mention. It does not appear as if there is any preferred form the gold must take since good results have been obtained with gold black, microscopically divided gold with a diffuse brown or red color and metallic gold with a mirror like surface. Those skilled in the art know of many ways of applying gold, such as chemical deposition from a liquid solution, reduction of a gold salt, electroplating, mechanical application, vapor deposition and sputtering.

In addition to the known ways of coating gold, a preferred way according to the invention herein is the sputtering of gold on the inside of glass cylinder tubes which produces an excellent catalyst. In this case, a gold cathode is slowly moved through the inside of the cylindrical tube. The ionic collisions with the gold cathode sputtered gold coat the surrounding tube. Gold in this form has a dark blue color. Heating this gold, after deposition, can turn the gold to a bright pink color.

The hypothesis which led to the experiment with gold as a catalyst was based on the possibility that CO would form a monolayer of attached molecules on a clean gold surface. Then, the energetic forms of oxygen formed in the discharge would be able to combine with the attached CO because the gold would act as the necessary third body to remove the excess energy.

An experiment which tends to support this theory was performed. It was observed that if an electrical discharge containing air and helium is substituted for the normal $CO_2$, $N_2$, He in a discharge tube with a gold catalyst, then the catalytic gold is observed to be temporarily poisoned. When the $CO_2$, $H_2$, He discharge is first started following this poisoning, the gold exhibits little (if any) catalytic activity. However, after 30 seconds exposure to the discharge, the gold has recovered some of its catalytic activity and after about 10 minutes, the gold has recovered most of its activity. The above hypothesis would explain this because either oxygen or water vapor also can form a monolayer on the gold. The discharge with air covered the gold with this inert monolayer. The CO took some time to reestablish itself, displacing some of the oxygen or water vapor layer.

However, to rapidly reach maximum chemical activity, it is necessary to activate the gold surface. This is done by exposing the gold catalyst to a discharge in a gas which actively removes this monolayer. A few seconds exposure to a discharge in a mixture of CO, $N_2$ and He does this. A mixture of just $N^2$ and He also works. Even adding a small amount of CO to the $CO_2$, $N_2$, He mixture will work, but not as rapidly as the other mixtures.

The preferred gas mixture for a $CO_2$ laser will have a slight excess of CO. In general, gold will not make a good catalyst when it is also being used as an electrode since the ions present in the discharge are mostly species which would displace CO from the gold surface. Since these ions are attracted to the electrodes, this would tend to have a poisoning effect on the gold, since the CO layer would be destroyed.

It should also be pointed out that gold coated resonator mirrors have been used in $CO_2$ lasers since this type of laser was first invented. However, these gold mirrors did not show any measurable catalytic activity because of their placement relative to the amplification volume. In the explanation of FIG. 1, it was said that energetic oxygen has a short lifetime. The lack of a discharge near the gold mirror prevents energetic oxygen from reaching the gold surface. The process stops with the formation of $O_2$. Even if energetic oxygen could reach the gold mirror, the decomposition rate of step 11 in FIG. 1 is fast enough that the gold mirror could only influence the gas composition in a volume very close to the mirror. At greater distances, steps 12, 13 and 15 decrease in speed proportional to the square of the diffusion distance.

This same reasoning illustrates why it is important to spread the gold catalyst along the length of the surface facing the amplification volume. The decomposition is taking place throughout the volume of the discharge. The rates of the steps in FIG. 1 are such that, for a diffusion limited laser, the catalyst can only compete against this decomposition rate if the diffusion distances are sufficiently short.

Although the above has centered on application to $CO_2$ lasers, it should be understood that various other adaptations, modifications and applications may be made within the spirit and scope of the invention, as for instance, in an environment where it is desirable to form $CO_2$ at temperatures lower than the temperature which platinum or paladium become efficient catalysts (about 300° C.). The key ingredients are: (1) a source of CO, (2) a source of energetic oxygen, (3) a catalytically active gold surface and (4) placement of this gold surface close enough to the source of the energetic oxygen that, considering the energetic oxygen lifetime and gas transport rates, the gold can be struck by the energetic oxygen.

Sources of energetic oxygen can include any source which can put enough energy into a molecule which contains at least one atom of oxygen to form one of the previously mentioned forms of energetic oxygen. Sources of such energy include: electrical discharge, ultraviolet light (and other more energetic forms of electromagnetic radiation shorter than about 3000 Angstroms) and rapidly moving subatomic particles, such as alpha particles, neutrons, protons, electrons, etc.

Additionally, the technique involving the use of a gold catalyst, and a source of energy such as a gaseous discharge or ultra violet light can be used to oxidize certain types of other molecules. These other molecules would have to fit the criteria of being a gas at a pressure greater than 0.1 torr, have an oxygen atom in the molecule and also having this oxygen atom located in such a position in the molecule as to be able to form an attachment site to gold.

While the above has centered on a laser oscillator, the teachings herein apply equally well to a laser amplifier. Therefore, to cover both these categories, the term "laser device" is appropriate. Additionally, the gas in a $CO_2$ laser has been mentioned herein as made up of $CO_2$, $N_2$ and He. This was only mentioned as an example. It is to be understood that other gas mixtures, such as $CO_2$, CO, He, are also commonly use in sealed off lasers. Other gas additives include Xe, $H_2O$, $D_2$, Ar, etc. The teachings herein apply to these and other $CO_2$ laser mixtures. Further, in rating the effectiveness of a catalyst, it is grammatically easier to talk about minimizing the decomposition products rather than maximizing the amount of $CO_2$. In particular, it is desirable to minimize the amount of oxygen in the amplification volume because oxygen has a detrimental effect on the laser output power and discharge stability.

In some $CO_2$ lasers, a portion of the laser light reflects off the walls of the cavity. An example of this would be the walls of a waveguide laser. While these walls function as a type of reflector, this is distinctly different from the laser resonator mirrors such as 27 and 28 in FIG. 2. A gold surface can simultaneously function as a catalyst and reflector for wall reflection. However, as previously stated, gold coated resonator mirrors are not properly positioned to also function as an effective catalyst.

While there has been shown and described a preferred embodiment, it is to be understood that other modifications may be made without departing from the spirit and scope of the invention.

I claim:

1. A $CO_2$ laser device including a closed envelope containing a $CO_2$ laser gas mixture and laser amplification volume, said amplification volume including an electrical discharge through said $CO_2$ laser gas mixture, said discharge causing decomposition of $CO_2$ in said mixture to form carbon monoxide, oxygen, and energetic forms of oxygen, the improved feature comprising:

inside said envelope there is at least one surface coated with gold;

said gold surface is positioned and configured as to promote contact with both said carbon monoxide and said energetic forms of oxygen generated in said amplification volume for purposes of catalizing formation of $CO_2$.

2. The combination according to claim 1 wherein the said gold catalyst is on at least a portion of the wall area facing said amplification volume, said gold is distributed over a sufficiently broad area of said well area so as to promote the catalytic formation of $CO_2$ in at least a substantial portion of said laser gas mixture in said amplification volume.

3. The combination according to claim 2 where said gold catalyst is supported by a dielectric material and where said gold catalyst forms multiple, generally microscopic regions which are electrically insulated from each other.

4. The combination according to claim 2 where said gold catalyst has been divided into multiple, generally macroscopic, regions which are electrically insulated from each other.

5. The combination according to claim 1 wherein said gold catalyst and said electrode are different.

6. The combination according to claim 5 wherein the said gold catalyst functions independently as part of a laser resonator reflector.

7. The combination according to claim 1 wherein said $CO_2$ laser device has said gas mixture rapidly flowing through said amplification volume and where said gold coated surface is a relatively large surface area structure designed to make intimate contact with said flowing gas and positioned sufficiently close to the gas exhaust end of said amplification volume to be contacted by a substantial amount of said energetic oxygen. Further, in operation, said gold catalyzes the formation of $CO_2$ to the extent that there is a substantial reduction in the total molecular oxygen in the amplification volume compared to the oxygen content without said gold coating.

8. In a method for converting carbon monoxide and oxygen to $CO_2$ the steps in no particular order comprising:

provide a means for forming at least one energetic form of oxygen;

provide a gold coated surface positioned so as to promote contact with both said carbon monoxide and said energetic form of oxygen for the purposes of making catalytic formation of $CO_2$.

9. The method of claim 8 where the step of providing a means for forming at least one energetic form of oxygen includes the step of providing energy to a source of oxygen, said energy means selected from the group consisting of:

an electrical discharge, electromagnetic radiation shorter than 3000 Angstroms wavelength, or rapidly moving subatomic particles.

10. The method of claim 9 where the step of providing an energy source includes providing an electric discharge in a $CO_2$ laser device.

11. The method of claim 8 where the step of providing a gold coated surface includes supporting said gold surface with a dielectric material and also dividing said gold surface in such a way as to form multiple electrically insulated islands of gold.

* * * * *